April 1, 1958    C. W. LINCOLN ET AL    2,828,829
FLUID POWER STEERING
Filed Dec. 11, 1953    2 Sheets-Sheet 1
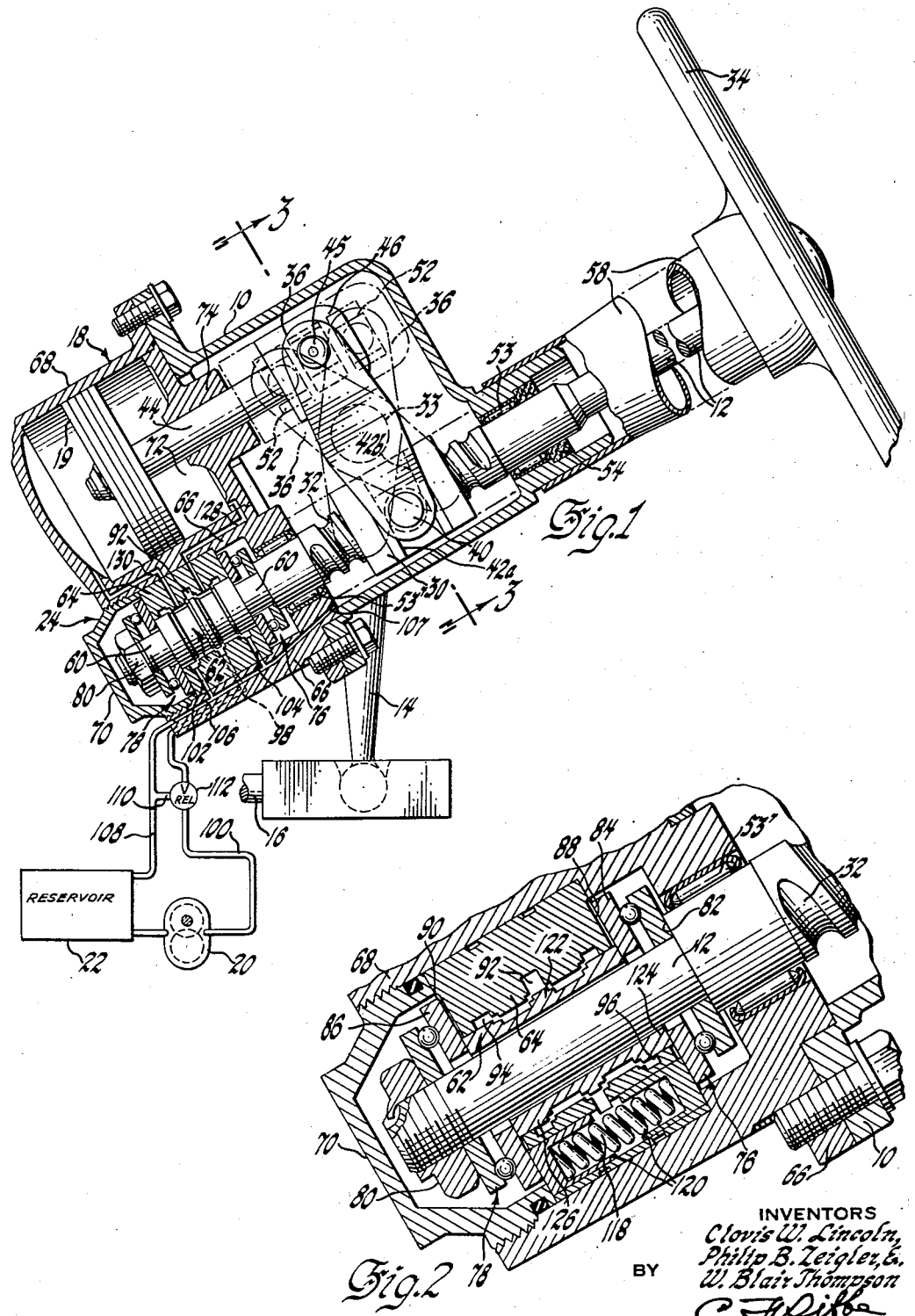
INVENTORS
Clovis W. Lincoln,
Philip B. Zeigler, &
W. Blair Thompson
BY
ATTORNEY April 1, 1958     C. W. LINCOLN ET AL     2,828,829
FLUID POWER STEERING Filed Dec. 11, 1953     2 Sheets-Sheet 2

INVENTORS
Clovis W. Lincoln,
Philip B. Zeigler, &
W. Blair Thompson
ATTORNEY

2,828,829

FLUID POWER STEERING

Clovis W. Lincoln, Philip B. Zeigler, and William Blair Thompson, Saginaw, Mich., assignors to General Motors Corporation, Detroit, Mich., a corporation of Delaware Application December 11, 1953, Serial No. 397,722

3 Claims. (Cl. 180—79.2)

This invention relates to the power steering of automotive vehicles and the like and more specifically concerns a fluid power steering gear of improved design and operating characteristics.

Hydraulic power steering gears heretofore proposed are open to objection on various grounds. Thus, these gears have been deservedly criticized on the basis that they are lacking in the compactness which characterizes any properly engineered product of the general class. Another criticism goes to the fact that means providing for ready adjustment of certain parts prone to become misaligned on continued use of the gear are either lacking or are positioned in difficultly accessible locations. And many of the prior gears are further objectionable in that they do not provide a variable steering gear ratio, allowing for faster steering in sharp turn situations as is highly desirable.

As indicated, the present invention has as its principal objects to provide a hydraulic power steering gear which represents a unified package demanding a minimum space for its installation; which makes possible the attainment of a variable steering gear ratio, with the ratio higher over center than at the extreme right and left turn positions; and which is easily and readily adjusted and maintained.

Other objects and features of the invention will be apparent from the following specific description addressed to a preferred embodiment thereof. The description will proceed with reference to the accompanying drawings in which:

Figure 1 shows the particular gear as associated with conventional steering members; certain parts of the gear appearing in section and/or in side elevation, other parts being represented diagrammatically;

Figure 2 is a longitudinal section through the valve component;

Figure 3:
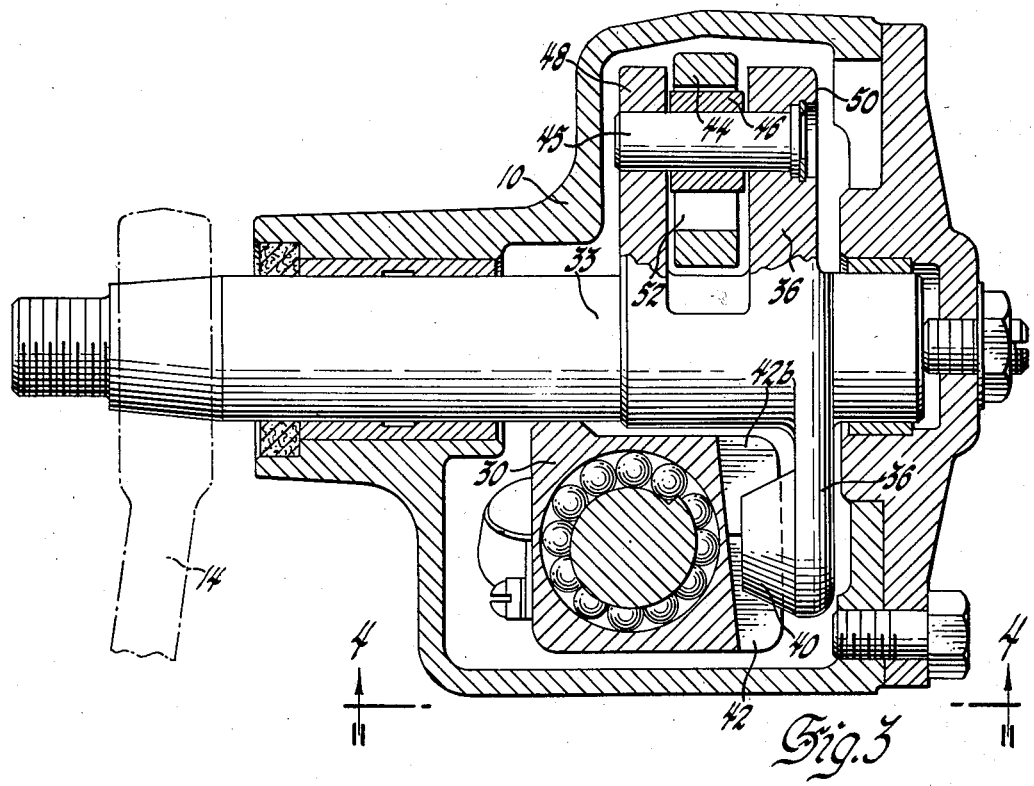
Figure 3 is a section on the line 3—3 in Figure 1.

Referring first to Figure 1, it will be observed that the illustrated system includes a gear box or casing 10 confining means for translating the rotary motion of the steering shaft 12 into a rocking motion manifested through the pitman or drop arm 14, operably connected to a drag link 16; a fluid motor 18 comprising a double acting piston 19; a pump 20 drawing from a reservoir 22; and an "open center" valve 24 controlling the flow of the fluid medium, normally a mineral oil of suitable viscosity and other characteristics, to the motor 18.

While hydraulic operation of the car is preferred as indicated, the same may be adapted for vacuum operation or for operation by means of compressed air, for example.

The means for attaining the desired rocking movement of the pitman arm 14, shown as having a ball and socket connection with the drag link 16, include a ball nut 30, which on rotation of the steering wheel 34, fast on the shaft 12, is caused to move axially up or down on the worm 32 integral with the shaft, the direction of movement of the nut being determined by the direction of rotation of the wheel.

Figure 4:
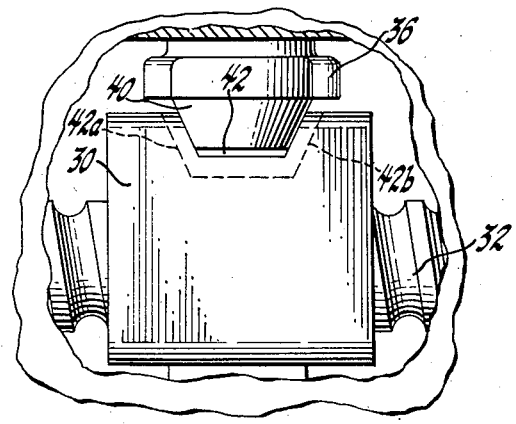
Figure 4 is fragmentary detail taken on the line indicated in Figure 3.

In conventional constructions, employing a ball nut, the same carries rack teeth, which engage with a gear sector integral with or fixed to the cross shaft from which the pitman depends—see, for example, Hawkins Patent 2,267,524, from which an understanding of the modus operandi of ball nuts may also be gained. In the present case, contrary to conventional practice, the ball nut 30 and the cross or rock shaft 33 are interconnected via a lever 36 shown as integral with the cross shaft and carrying at its lower end a tapered pin 40 (Figure 3) accommodated in a complementarily tapered slot 42 in the ball nut. The tapered walls 42a, 42b of this slot as shown by Figures 1 and 4 diverge above the pin 40 (which in its neutral or centered position, abuts these walls) in order to provide a desired amount of lash off center. Considering the fixed pivot point represented by the shaft 33, it should be clear that when the pin is off center, i. e. displaced to the right or to the left, the same necessarily occupies a higher position in the slot. The tight fit of the pin against the walls of the slot when the pin is centered is desirable as providing an immediate resistance to the initial effort at the steering wheel, important from the standpoint of steering "feel."

The upper end of the lever 36 is formed as a yoke or trunnion (Figure 3) so as to contain the enlarged end of the piston shaft 44, which is formed to accommodate a slide block 46 held by a pin 45 extending between the yoke arms 48, 50. With this arrangement, allowance is made for the arc through which the lever 36 turns. Thus, in the over-center or vertical position of the lever, the slide block 44 is disposed in the upper portion of the rectangular slot 52, but on swinging of the lever in either direction the block for obvious reasons descends in the slot, this motion being accompanied by ascent of the pin 40 in the slot 42.

It is through the arrangement just described, which amounts to a lost motion connection in a plane angular to the axis of the piston shaft, that the desired variance in "steering gear ratio" is achieved. This ratio, of course, is a function of the effective length of the lever 36 and the mechanical advantage it affords. Since the effective length of the lever is highest over center and lowest at the extreme right and left turn positions, relatively faster steering in the negotiation of sharp turns is afforded.

Reverting to the steering shaft 12, it is to be noted that the same turns in needle bearings 53, 53' at either end of the worm 32. The shaft is surrounded at 54 by a sealing member and is housed upwardly of the gear box 10 by a mast jacket 58 extending to the base of the steering wheel. The employment of the needle bearings in lieu of the more usual roller thrust bearings allows for limited axial movement of the steering shaft.

Steering shaft 12 terminates at its lower end in a portion 60 of reduced diameter concentric within a spool element 62 forming part of the valve 24. The valve housing 64 is shouldered into a pocket formed by a boss 66 integral with the cylinder component 68 of the fluid motor 18, this boss itself being shouldered into the gear box 10. The body of the valve is completed by a cap piece 70, shown as threaded into place.

To partition the right hand chamber 72 (Fig. 1) of the cylinder 68 from the upper portion of the gear box 10 there is provided an adapter 74 which furnishes a bearing for the piston shaft 44. Oil is permitted to bleed around the piston shaft through the bearing so as to provide for lubrication of the parts contained within the gear box.

Spool 62 is held to the reduced portion 60 of the shaft 12 via a nut 80 threaded on the end of the shaft. A pair of thrust bearings 76, 78 are disposed, respectively, mediate the nut and spool and mediate the spool and the shoulder 82 provided incident to the fabrication of the shaft. With this arrangement, the spool partakes of any axial movement of the steering shaft. The extent of such movement is set by the spaces between the inner components 84, 86 of the thrust bearings and the adjacent surfaces 88, 90 of the housing 64.

The valve housing 64 is internally bored and counterbored to form annular oil channels 92, 94 and 96. Channel 92 connects via a passageway 98 with a line 100 from the pump 20, while channels 94 and 96 connect through passageways 102 and 104, respectively, joining within the valve in a common passageway 106, with a line 108 terminating at the reservoir 22. Lines 100 and 108 will be noted as interconnected through a bypass line 110 and a relief valve 112 which may be of a spring-loaded ball type, for example. The relief valve serves to relieve the pressure in the pump discharge line whenever such pressure exceeds a predetermined value, calculated to avoid damage to any of the components of the system.

Valve spool 62 is normally maintained in its centered position within the housing 64 by means including a plurality of springs 118 which operate to resist axial movement of the spool and steering shaft in either direction. These springs are housed between plunger pairs 120, abutting the inner ring components 84, 86 of the thrust bearings 76 and 78, respectively. The springs and plunger pairs are contained in bores in the housing 64, five sets spaced equidistant around the housing being employed in the particular construction. Each of the bores opens to the annular channel 92 for a reason which will subsequently appear.

Spool 62 has a central land 122 and a pair of end lands 124 and 126 of the same diameter as the central land. The central land 122 controls the fluid flow within the valve, annular channel 92 connecting with the inlet porting as previously described, while lands 124 and 126 are functional with respect to passageways 128 and 130, respectively. These latter passageways, as will be seen from Figure 1, interconnect the valve and the fluid motor, passageway 128 terminating at the right-hand end of the cylinder 68, passageway 130 at the left-hand end thereof. In this figure, to simplify an understanding of the invention, all of the internal passageways comprised in the system are shown diagrammatically and in certain instances out of true position. In the commercial gear, open ends of the drilled lines that do not constitute part of the hydraulic circuit are closed by pressing a steel plug into the opening.

As mentioned hereinbefore, fluid is permitted to bleed into the casing 10 through the bearing supplied by the adaptor 74 in order to provide for lubrication of the parts contained within the casing. To prevent a pressure build-up in the casing, there is supplied a passageway 107 connecting the casing to the return circuit of the hydraulic system, i. e. to line 108.

With the valve spool 62 in its normal centered position, the hydraulic fluid from the pump 20, preferably powered from the engine of the vehicle, is divided into two streams at the central land 122. The stream diverted to the left flows across the annular channel mediate the central land and the end land 126, thence through the passageway 102 to the common return passageway 106. Similarly, the stream diverted to the right flows across the annular space between the central land and the end land 124, thence through the passageway 104 to the passageway 106. Passageways 128 and 130 being fully open when the valve spool is centered, both ends of the cylinder 68 are normally filled with fluid, maintained under a static pressure by the circulation of the fluid medium as just described.

The annular chamber 92 connecting with the inlet 98 from the pump is at all times open to the bores housing the springs 118. Thus, when the spool is moved axially to confine the fluid flow to one side or the other of the valve, the pressure which develops in such side (and in the corresponding chamber of the power cylinder 68) is applied in aid of the springs against the inner walls of the plungers 120. Accordingly, the resistance which must be overcome by the force tending to move the spool represents (disregarding friction) the sum of the force of the springs and the force of the developed pressure as applied to the plungers. This resistance may amount, for example, to from about two to eight pounds, being determined in any given case by the preloading of the springs 118, and is advantageous as providing a steering "feel" which would otherwise be lacking.

To describe now the general operation of the gear, let it be assumed that the vehicle is in motion and that the steering wheel 34 is rotated clockwise to negotiate a right turn. Clearly, any resistance on the part of the lever 36, the cross shaft 33 to rocking or turning will be manifested in a reactionary axial thrust on the shaft 12 tending to cause longitudinal movement of the shaft. Now, if the resistance is less than the spring centering force, no axial movement of the shaft and consequently no axial movement of the valve spool occurs, with the result that the vehicle is steered around the curve or corner solely by manual effort. On the other hand, if the resistance to the rocking of the lever 36 and the shaft 33 is greater than the spring centering force, the steering shaft, and with it the spool 62, is caused to move axially downwardly to bring about partial or complete confinement of the fluid flow (depending upon the exact magnitude of the steering resistance) to the right-hand chamber of the cylinder 68 and partial or complete closing of the passageway 104 which represents the exhaust line from such chamber. Piston 19 and shaft 44 are consequently forced to the left to rock the lever 36 and the cross shaft 33 in a counter-clockwise direction, this action being accompanied by exhaustion of fluid from the left chamber of the cylinder through passageway 130 and 102. A steering linkage bringing about turning of the dirigible wheels of the vehicle to the right on rearward movement of the drag link 16 is, of course, assumed.

Should the steering shaft be rotated in a counterclockwise direction to effect a leftward turning of the dirigible wheels, it should be clear that the action will be just the opposite of that described.

Having thus described and illustrated our invention, what we claim is:

1. In a fluid power steering gear, a rotatable steering shaft having a portion formed as a worm, a steering arm, means for translating the rotary motion of said shaft into a rocking motion manifested through said arm, said means including a ball nut surrounding said worm and actuated thereby, said nut having a slot therein provided with upwardly diverging side walls, a lever member movable through a neutral position operably associated with said arm and carrying a pin, said pin extending into the lower portion of said slot when in the neutral position and movable longitudinally thereof, said pin contacting the side walls of said slot to have a tight fit therein only in the neutral position of said lever member, a source of fluid pressure, a fluid motor arranged to power said arm when energized, and a control valve for said motor actuated by said shaft.

2. In a fluid power steering gear, a rotatable steering shaft having a portion formed as a worm, a steering arm, means for translating the rotary motion of said shaft into a rocking motion manifested through said arm, said means including a ball nut surrounding said worm, said nut having a slot therein provided with upwardly diverging side walls, a lever member movable through a neutral position operably associated with said arm and carrying at one end a pin, said pin extending into the lower portion of said slot when in the neutral position and movable longitudinally thereof, said pin contacting the side walls of said slot to have a tight fit therein only in the neutral position of said lever member, a source of fluid pressure, a fluid motor comprising a cylinder confining a piston having a shaft connected to the other end of said lever member, said other end of the lever member being slotted to accommodate the piston shaft and carrying a pin extending through an aperture in the piston shaft, such connection providing a progressively decreasing mechanical advantage as said lever is rocked from its neutral position, and a control valve for said motor actuated by said steering shaft.

3. In a fluid power steering gear, a rotatable steering shaft having a portion formed as a worm, said shaft being supported for limited axial movement, a steering arm, means for translating the rotary motion of said shaft into a rocking motion manifested through said arm, said means including a ball nut surrounding said worm, said nut having a slot therein formed with upwardly diverging side walls, a lever member movable through a neutral position operably associated with said arm and carrying at one end a tapered pin, said pin extending into the lower portion of said slot when in the neutral position and movable longitudinally thereof, said pin contacting said side walls to have a tight fit therebetween only in the neutral position of said lever member, a source of fluid pressure, a fluid motor comprising a cylinder confining a piston having a shaft connected to the other end of said lever member, said other end being slotted to accommodate the piston shaft and carrying a pin extending through an aperture in said piston shaft, said connection providing a progressively decreasing mechanical advantage as said lever is rocked from its neutral position, and a control valve for said motor actuated by axial movement of said steering shaft induced by a reactionary thrust exerted through said arm.

References Cited in the file of this patent

UNITED STATES PATENTS

| | | |
|---|---|---|
| 1,719,875 | Cooper | July 9, 1929 |
| 1,959,177 | Sassen | May 15, 1934 |
| 1,967,482 | Schmidt | July 24, 1934 |
| 2,065,513 | Centervall | Dec. 29, 1936 |
| 2,073,717 | Twyman | Mar. 16, 1937 |
| 2,213,271 | Davis | Sept. 3, 1940 |
| 2,640,322 | Puerner | June 2, 1953 |

FOREIGN PATENTS

| | | |
|---|---|---|
| 662,724 | Great Britain | Dec. 12, 1951 |
| 679,346 | Great Britain | Sept. 17, 1952 |